United States Patent
Baba

(10) Patent No.: US 9,645,236 B2
(45) Date of Patent: May 9, 2017

(54) TARGET DETECTION APPARATUS AND PROGRAM

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 133 days.

(21) Appl. No.: 14/465,033

(22) Filed: Aug. 21, 2014

(65) Prior Publication Data
US 2015/0054673 A1   Feb. 26, 2015

(30) Foreign Application Priority Data

Aug. 22, 2013 (JP) ................................ 2013-172283

(51) Int. Cl.
*G01S 13/93* (2006.01)
*G01S 13/86* (2006.01)
*G01S 7/40* (2006.01)

(52) U.S. Cl.
CPC .......... *G01S 13/867* (2013.01); *G01S 7/4026* (2013.01); *G01S 13/931* (2013.01);
(Continued)

(58) Field of Classification Search
CPC ........ G01S 13/86; G01S 13/867; G01S 13/93; G01S 13/931
(Continued)

(56) References Cited

U.S. PATENT DOCUMENTS 6,191,704 B1 * 2/2001 Takenaga ............... G01S 13/931
                                                      180/169
6,590,521 B1 * 7/2003 Saka ..................... G01S 13/931
                                                      180/167
(Continued)

FOREIGN PATENT DOCUMENTS

JP    2006-292475    10/2006
JP    2007-155469    6/2007
(Continued)

OTHER PUBLICATIONS

Office Action dated Jun. 2, 2015 in corresponding JP application No. 2013-172283 (with translation).

*Primary Examiner* — Peter Bythrow
(74) *Attorney, Agent, or Firm* — Harness, Dickey & Pierce, P.L.C.

(57) ABSTRACT

A first specifying-means specifies a first-region including a first detection-point, which is of a first-target on an X-Y plane on which a width direction of a vehicle is defined as an X-axis, and a longitudinal direction of the vehicle is defined as a Y-axis. A second specifying-means specifies a second-region including a second detection-point, which is of a second-target on the X-Y plane, based on a direction of the second detection-point and a target-width, which is a width along the X-axis of the second-target. A determination means determines that the first- and second-targets are the same, provided that an overlapping portion exists therebetween. An estimation means estimates a true-value target-width, based on the direction of the second detection-point and the first detection-point, provided that the first- and second-targets are the same. A correction-means corrects a position of the second-region specified next time by using the true-value target-width as the target-width.

11 Claims, 5 Drawing Sheets

(52) U.S. Cl.
CPC ... *G01S 2007/403* (2013.01); *G01S 2013/935* (2013.01); *G01S 2013/9346* (2013.01)

(58) Field of Classification Search
USPC .......................................... 342/52–55, 70–72
See application file for complete search history.

(56) References Cited

U.S. PATENT DOCUMENTS

| | | | | |
|---|---|---|---|---|
| 7,453,374 B2* | 11/2008 | Koike | .................... | B60Q 9/008 180/167 |
| 7,825,849 B2* | 11/2010 | Tsuchida | ............... | G01S 13/931 342/52 |
| 8,610,620 B2* | 12/2013 | Katoh | .................. | G01S 13/931 342/52 |
| 2003/0097237 A1* | 5/2003 | Sekiguchi | ............... | G01S 11/12 702/158 |
| 2003/0201929 A1* | 10/2003 | Lutter | .................... | G01S 7/032 342/52 |
| 2004/0080449 A1* | 4/2004 | Horibe | ................. | G01S 7/4026 342/70 |
| 2004/0098224 A1* | 5/2004 | Takahashi | ............. | G01S 7/4026 702/181 |
| 2005/0062615 A1* | 3/2005 | Braeuchle | .......... | B60K 31/0008 340/903 |
| 2006/0155469 A1* | 7/2006 | Kawasaki | ............. | B60R 21/013 701/301 |
| 2006/0274149 A1* | 12/2006 | Yoshizawa | .......... | B60R 21/0134 348/148 |
| 2007/0075892 A1* | 4/2007 | Horibe | .................. | G01S 17/023 342/70 |
| 2007/0171121 A1* | 7/2007 | Munakata | ............. | G01S 13/931 342/55 |
| 2008/0079954 A1* | 4/2008 | Iwaki | ....................... | G01C 3/08 356/614 |
| 2008/0300787 A1* | 12/2008 | Zeng | ..................... | G01S 7/4026 701/301 |
| 2009/0135065 A1* | 5/2009 | Tsuchida | ............... | G01S 13/931 342/454 |
| 2009/0201192 A1* | 8/2009 | Tokoro | ................ | B60R 21/0134 342/70 |
| 2010/0191391 A1* | 7/2010 | Zeng | ..................... | G01S 13/723 701/1 |
| 2011/0234761 A1* | 9/2011 | Yumiba | ..................... | B60R 1/00 348/46 |
| 2012/0106786 A1* | 5/2012 | Shiraishi | ............... | G01S 13/867 382/103 |
| 2013/0335569 A1* | 12/2013 | Einecke | ................ | G01S 13/867 348/148 |
| 2014/0035775 A1* | 2/2014 | Zeng | ..................... | G01S 13/867 342/52 |
| 2014/0139369 A1* | 5/2014 | Baba | ..................... | G01S 13/867 342/146 |

FOREIGN PATENT DOCUMENTS

| | | |
|---|---|---|
| JP | 2010-134878 A | 6/2010 |
| JP | 2014-122873 | 7/2014 |

* cited by examiner

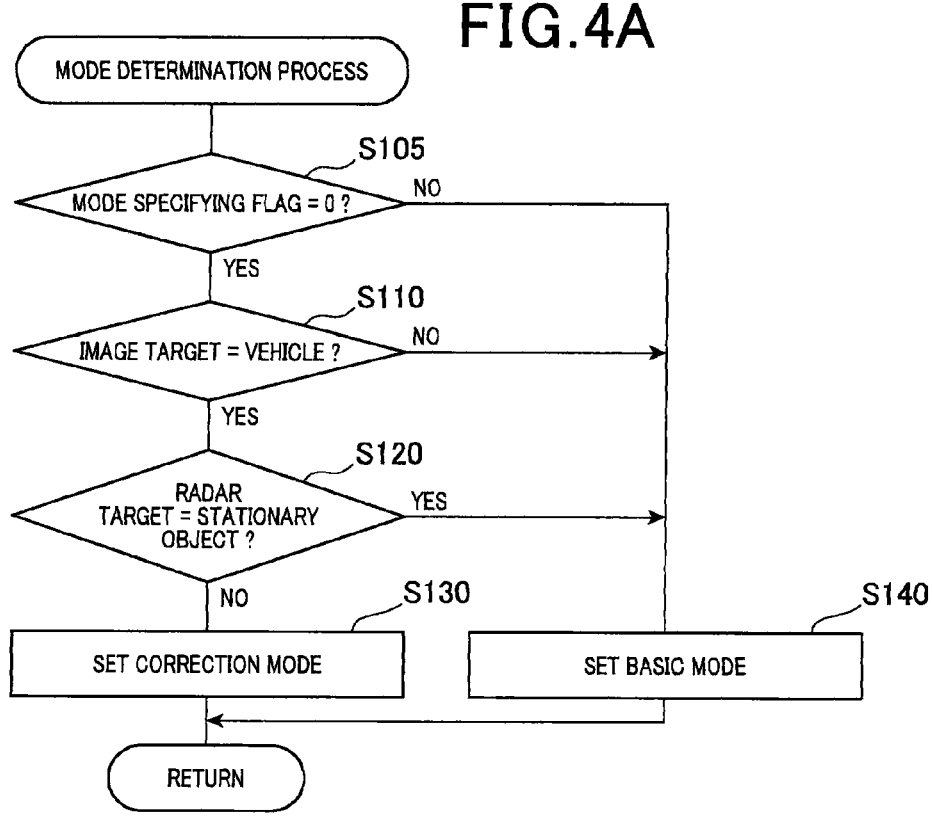
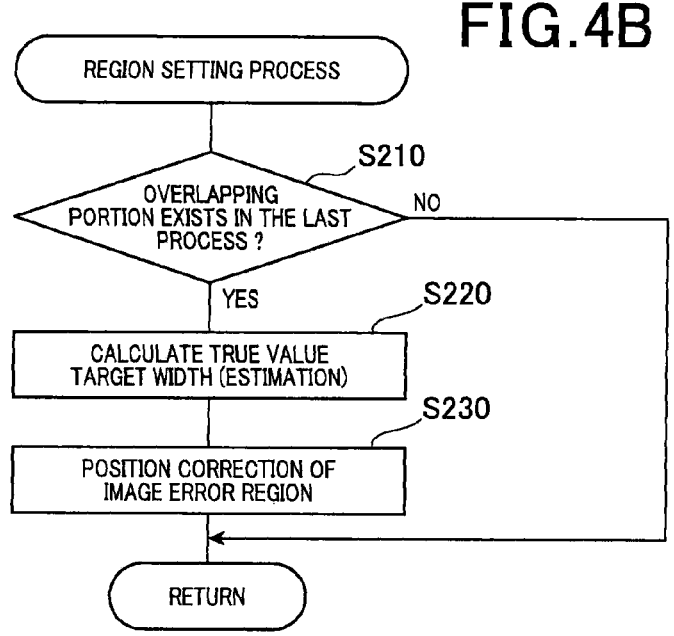

TARGET DETECTION APPARATUS AND PROGRAM

CROSS-REFERENCE TO RELATED APPLICATION

This application is based on and claims the benefit of priority from earlier Japanese Patent Application No. 2013-172283 filed Aug. 22, 2013, the description of which is incorporated herein by reference.

BACKGROUND

Technical Field

The present invention relates to a technique for detecting a target by using a radar and a camera.

Related Art

For example, a collision avoidance system for a vehicle is required to accurately detect a target such as another vehicle or a pedestrian. In response to this, JP-A-2006-292475 discloses a configuration for detecting a target by using a radar and a camera. Specifically, according to the configuration disclosed in JP-A-2006-292475, a target is detected by a millimeter-wave radar and a stereo camera individually. If the position relation between the target detected by the millimeter-wave radar and the target detected by the stereo camera meets a criterion for judgment, it is determined that the targets are the same. When the distances from the millimeter-wave radar and the stereo camera to the target are longer, the criterion for judgment is changed so that the targets are easily determined to be the same.

Meanwhile, detection information of the radar is suited to measure distances because the distances can be measured based on radar waves reflected from the target. However, it is uncertain which position on the target the radar wave is reflected from. Hence, an error corresponding to the breadth (width) of the target (target width) is generated, which is relatively disadvantageous to measure the direction of the target.

Although image information from the camera has performance of measuring distances lower than that of detection information from the radar, the target can be identified based on an actually picked up image. Hence, the image information of the camera is suited to measure the target width and the direction.

Hence, the radar and the camera are used to detect the target. Thereby, the radar and the camera mutually complement measurements at which the radar and the camera are poor to improve accuracy in detecting the position of the target. In this case, a step is required first in which the identity between the targets is determined based on the detection information of the radar and the image information of the camera.

However, regarding the image information of the camera, when the road gradient of the position of the vehicle is different from the road gradient of the position of the target, or when the vertical direction of the camera varies due to a pitching of the vehicle even if the road gradients are the same, the point at infinity on the image is shifted from the actual point. Thereby, it can be considered that, for example, a measurement error of the target width is generated.

Hence, for example, as in the case of the configuration disclosed in JP-A-2006-292475, if the criterion for judgment is merely relaxed depending on the distance to the target, the difference between the road gradients and influence of the pitching of the vehicle are not reflected. Hence, accuracy in determination concerning the identity of the targets may be lowered.

SUMMARY

An embodiment provides a target detection apparatus which detects a target by using a radar and a camera, and by which erroneous determination of the target can be avoided.

As an aspect of the embodiment, a target detection apparatus is installed in a vehicle. The apparatus includes: a first specifying means for specifying, of a first target detected based on detection information of a radar, a first region which includes a first detection point, which is a detection point of the first target on an X-Y plane on which a width direction of the vehicle is defined as an X-axis, and a longitudinal direction of the vehicle is defined as a Y-axis; a second specifying means for specifying, of a second target detected based on an image taken by a camera, a second region which includes a second detection point, which is a detection point of the second target on the X-Y plane, based on a direction of the second detection point and a target width, which is a width along the X-axis of the second target; a determination means for determining that the first target and the second target are the same, provided that an overlapping portion exists between the first region and the second region; a true value target width estimation means for estimating a true value target width, which is a true value of the target width, based on the direction of the second detection point of the second region and the first detection point of the first region, provided that the determination means determines that the first target and the second target are the same; and a position correction means for correcting a position of the second region specified by the second specifying means next time by using the true value target width as the target width.

BRIEF DESCRIPTION OF THE DRAWINGS

In the accompanying drawings:

FIG. 4A is a flowchart of a process (step) in S50 of the embodiment;

FIG. 4B is a flowchart of a process (step) in S70 of the embodiment;

DETAILED DESCRIPTION OF THE PREFERRED EMBODIMENTS

With reference to the accompanying drawings, hereinafter is described an embodiment. Throughout the drawings, components identical with or similar to each other are given the same numerals for the sake of omitting unnecessary explanation.

<General Configuration>

Figure 1:
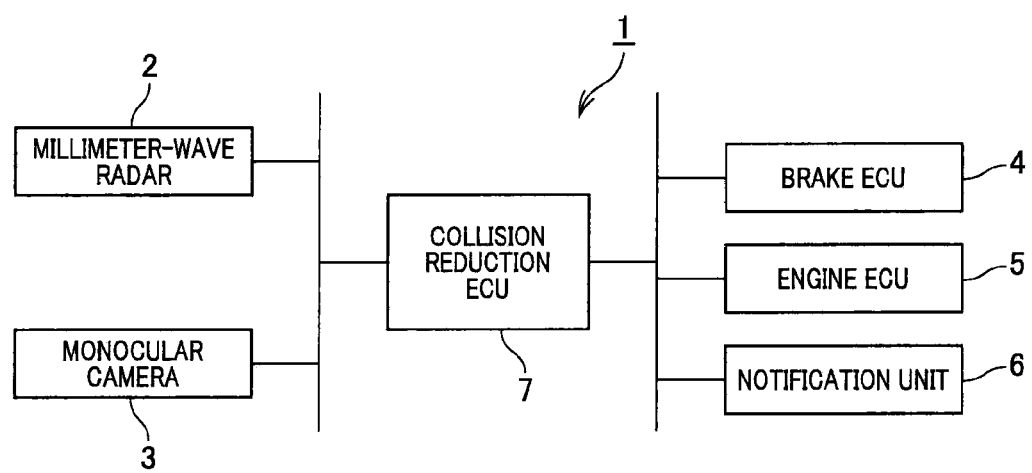
FIG. 1 is a block diagram showing a configuration of a collision reduction apparatus according to an embodiment.

A collision reduction apparatus 1 shown in FIG. 1 is installed in a vehicle. The collision reduction apparatus 1 includes a millimeter-wave radar 2, a monocular camera 3, a brake ECU (electronic control unit) 4, an engine ECU 5, a notification unit 6, and a collision reduction ECU 7. In the collision reduction apparatus 1, the collision reduction ECU 7 is connected to the millimeter-wave radar 2, the monocular camera 3, the brake ECU 4, the engine ECU 5, and the notification unit 6 so as to communicate with each other. Note that the configuration realizing communication is not particularly limited. In addition, instead of the millimeter-wave radar 2, another in-vehicle radar may be used which uses radar waves or ultrasonic waves. Instead of the monocular camera 3, a stereo camera may be used.

The millimeter-wave radar 2 is used for detecting a target (another vehicle, a pedestrian or the like) by using millimeter waves. The millimeter-wave radar 2 is mounted on the center (head) at the front side of an own vehicle (the vehicle in which the collision reduction apparatus 1 is installed). The millimeter-wave radar 2 transmits millimeter waves ahead of the own vehicle while scanning a horizontal plane with the millimeter waves, and receives the reflected millimeter waves, thereby obtaining transmitted and received data. The millimeter-wave radar 2 transmits the transmitted and received data as a radar signal to the collision reduction ECU 7.

The monocular camera 3 includes one CCD camera and is mounted on the center at the front side of the own vehicle. The monocular camera 3 transmits data of an image taken by the CCD camera as an image signal to the collision reduction ECU 7.

The brake ECU 4 is an electronic control unit which controls braking of the own vehicle and includes a CPU, a ROM, and a RAM. Specifically, the brake ECU 4 controls a brake ACT, which is an actuator opening and closing a voltage increase control valve and a voltage decrease control valve provided in a brake hydraulic pressure circuit, depending on a detection value of a sensor which detects the depression amount of a brake pedal. In addition, the brake ECU 4 controls a throttle ACT so as to increase braking force of the own vehicle in accordance with an instruction issued from the collision reduction ECU 7.

The engine ECU 5 is an electronic control unit which controls start/stop, fuel injection quantity, ignition timing and the like of an engine. The engine ECU 5 includes a CPU, a ROM, and a RAM. Specifically, the brake ECU 5 controls a throttle ACT, which is an actuator opening and closing a throttle provided to a suction pipe, depending on a detection value of a sensor which detects the depression amount of an accelerator pedal. In addition, the engine ECU 5 controls a throttle ACT so as to decrease driving force of an internal combustion engine in accordance with an instruction issued from the collision reduction ECU 7.

When the notification unit 6 receives an alarm signal from the collision reduction ECU 7, the notification unit 6 provides notification to the driver of the vehicle by using sound, light or the like.

The collision reduction ECU 7 is an electronic control unit which integrally controls the collision reduction apparatus 1. The collision reduction ECU 7 includes a CPU, a ROM, and a RAM. The collision reduction ECU 7 receives a radar signal from the millimeter-wave radar 2 and an image signal from the monocular camera 3 at regular time intervals based on a master clock of the CPU.

<Target Detection Method>

Figure 2:
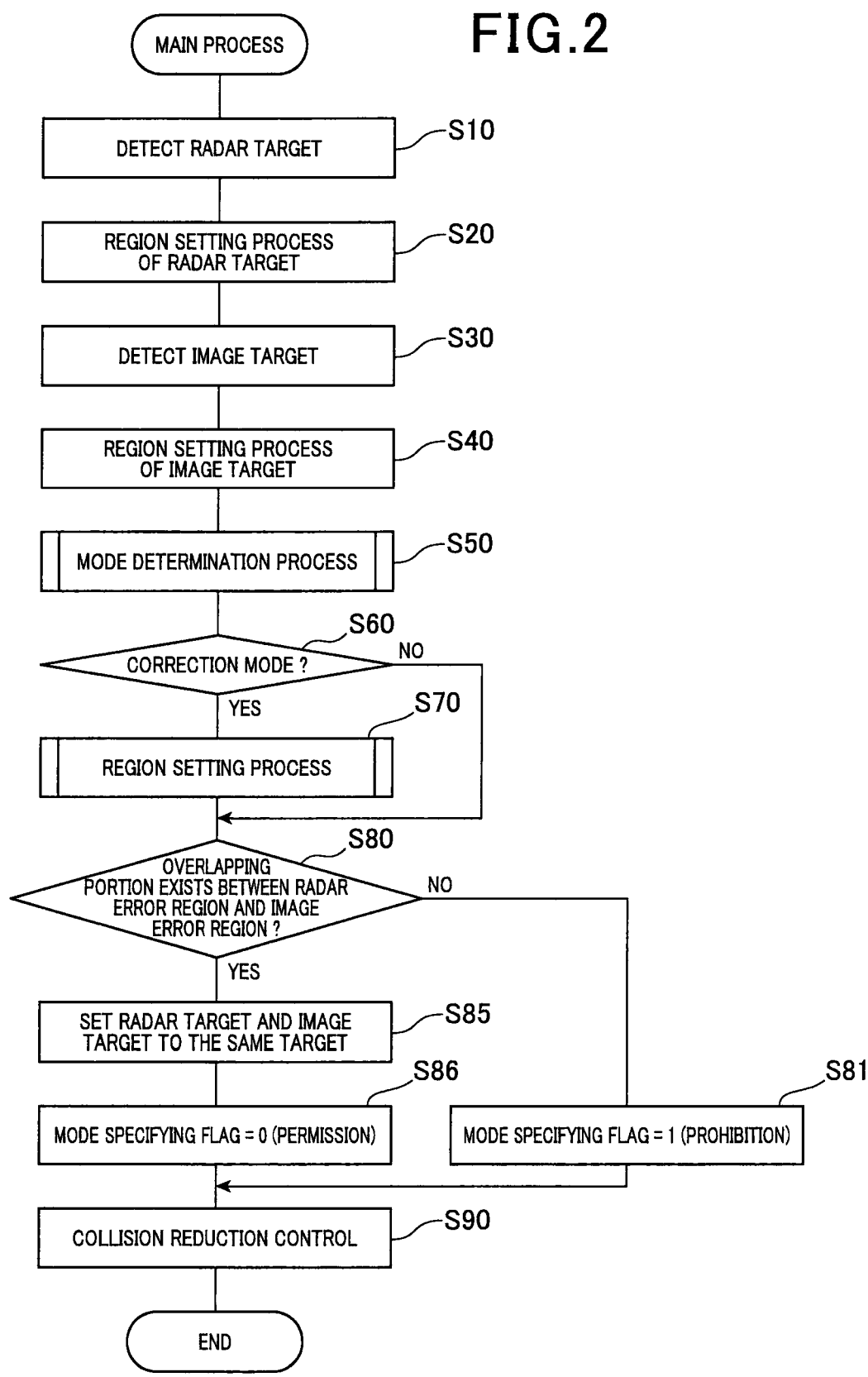
FIG. 2 is a flowchart of a main process (step) executed by a collision reduction ECU according to the embodiment.

Next, a target detection method of the collision reduction apparatus 1 is explained. In the ROM (non-transitory computer readable recording medium) of the collision reduction ECU 7, a target detection program is stored which is a program for realizing target detection by the collision reduction apparatus 1 (computer). Hereinafter, a process (step) (main process (step)) performed by the collision reduction ECU 7 according to the target detection program is explained with reference to a flowchart shown in FIG. 2. Note that the main process shown in FIG. 2 is repeatedly performed in predetermined cycles.

Figure 3:
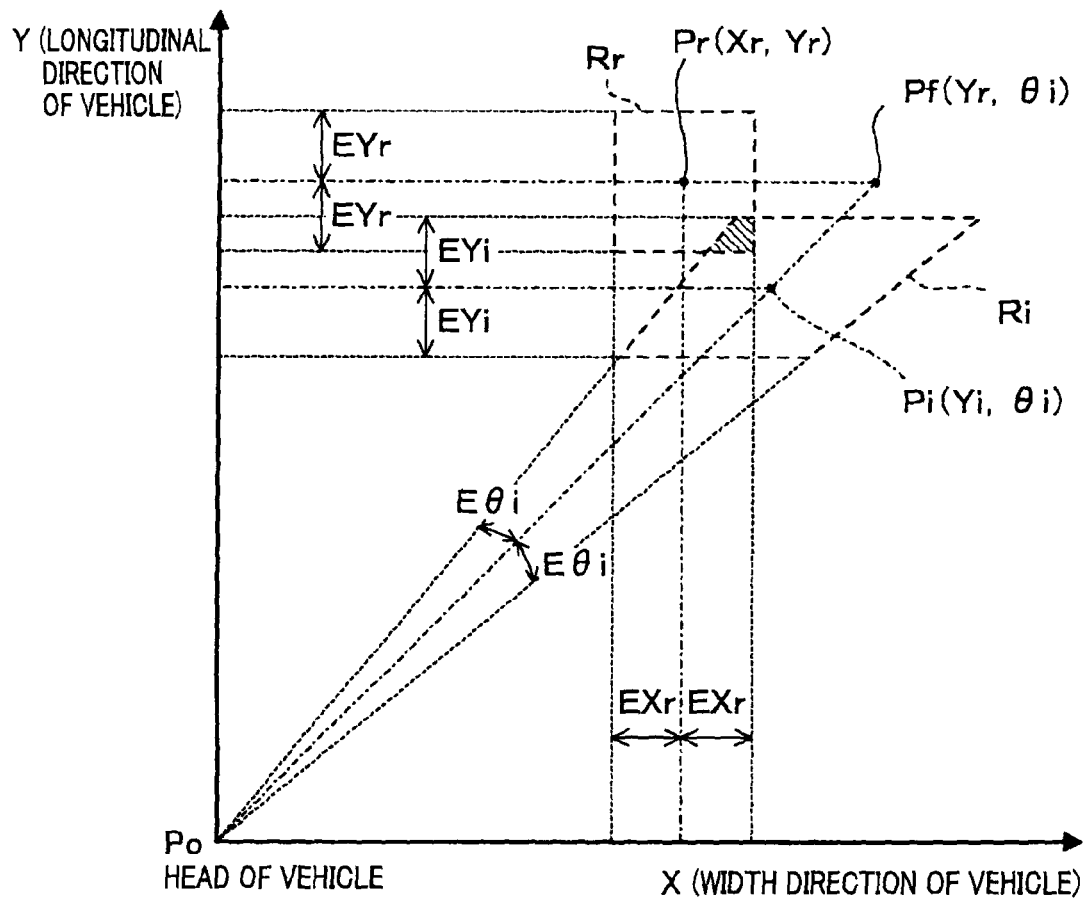
FIG. 3 is a diagram showing an error region set in the embodiment.

First, the collision reduction ECU 7 detects a target based on a radar signal transmitted from the millimeter-wave radar 2 (detection information of the millimeter-wave radar 2) (S10). Specifically, the collision reduction ECU 7 calculates (specifies) the shortest distance from the own vehicle to the target and the position of the target in the horizontal direction (angular position). Then, as shown in FIG. 3, the collision reduction ECU 7 calculates (specifies) a position coordinate (X-coordinate and Y-coordinate) of the target on the X-Y plane as a detection point Pr of the target on the X-Y plane. On this X-Y plane, the width direction of the own vehicle (lateral direction) is defined as an X-axis, and the longitudinal direction of the own vehicle (front-back direction) is defined as a Y-axis. In addition, on this X-Y plane, the end position of the own vehicle (the position at which the millimeter-wave radar 2 is provided) is set as a reference point Po, and the detection point Pr of the target indicates a relative position with respect to the reference point Po. Note that FIG. 3 shows an example of the target positioned in the front and right direction of the own vehicle. In addition, in S10, the collision reduction ECU 7 calculates relative speed between the target and the own vehicle in addition to the detection point Pr of the target. Hereinafter, the target detected in S10 (a target detected based on the detection information of the millimeter-wave radar 2) is referred as "radar target".

Next, as shown in FIG. 3, the collision reduction ECU 7 sets a radar error region Rr centering therein the detection point Pr of the radar target calculated in S10 (S20). Specifically, the collision reduction ECU 7 sets a region having a width corresponding to an assumed error, which is previously set based on characteristics of the millimeter-wave radar 2, as the radar error region Rr for each of the X-coordinate and the Y-coordinate, with reference to the X-coordinate and the Y-coordinate of the detection point Pr of the radar target.

For example, if the detection point Pr is expressed as (Xr, Yr), the assumed error of the X-coordinate is expressed as ±EXr, and the assumed error of the Y-coordinate is expressed as ±EYr, then the range of the X-coordinate of the radar error region Rr is expressed as Xr−EXr≤X≤Xr+EXr, and the range of the Y-coordinate of the radar error region Rr is expressed as Yr−EYr≤Y≤Yr+EYr. Note that expression of the radar error region Rr is not limited to the above. For example, the radar error region Rr may be expressed by using an assumed error of the Y-coordinate and an assumed error of the horizontal direction position.

Next, the collision reduction ECU 7 detects a target based on an image signal transmitted from the monocular camera 3 (image taken by the monocular camera 3) (S30). Specifically, the collision reduction ECU 7 analyzes an image indicated by the image signal to identify the target. This identification is made by, for example, a matching process (step) using a previously registered target model. Since the target model is prepared for each type of target (vehicle, pedestrian or the like), the type of target is also identified. Then, the collision reduction ECU 7 specifies the Y-coordinate on the X-Y plane based on the position of the target in the top and bottom direction on the image and the position of a focus of expansion (FOE) on the image. The collision reduction ECU 7 specifies the horizontal direction position (angular position) of the target based on the position of the target in the left and right direction on the image.

That is, as the position of the target in the front-back direction of the own vehicle is further (the Y-coordinate is larger), the lower end position of the target on the image tends to be higher. Hence, the Y-coordinate can be specified based on the predetermined point at infinity on the road surface on the image and the height of the end position of the target. Note that the identification method described above is characterized in that detection accuracy of the Y-coordinate becomes lower when the lower end position of the target is not accurately detected.

In addition, as the shift amount in the angular direction of the target with reference to the front-back direction of the own vehicle (specifically, the straight line of X=0) is larger, the shift amount of the target in the left and right direction on the image with reference to the point at infinity tends to be larger. Hence, the horizontal direction position of the target can be specified based on the distance from the point at infinity on the image to a vertical line passing through the center of the target.

That is, in S30, as shown in FIG. 3, the collision reduction ECU 7 specifies the Y-coordinate and the horizontal direction position (angular position) of the center of the target on the X-Y plane as a detection point Pi of the target on the X-Y plane. Note that, hereinafter, the target detected in S30 (the target detected based on the image taken by the monocular camera 3) is referred to as "image target".

Next, as shown in FIG. 3, the collision reduction ECU 7 sets an image error region Ri centering therein the detection point Pi of the image target calculated in S30 (S40). Specifically, the collision reduction ECU 7 sets a region having a width corresponding to an assumed error based on the target width, which is a width along the X-axis of the image target, as an image error region Ri for each of the Y-coordinate and the horizontal direction position, with reference to the Y-coordinate and the horizontal direction position of the detection point Pi.

For example, if the detection point Pi is expressed as (Yi, θi), and the assumed error of the Y-coordinate is expressed as ±EYi, then the range of the Y-coordinate of the image error region Ri is expressed as: Yi−EYi≤Y≤Yi+EYi. The assumed error of the horizontal direction position is ±Eθi, when the detection point Pi is temporarily expressed as (Xi, Yi), the target width is expressed as 2EXi, and the angle formed by two straight lines is expressed as 2Eθi. The straight lines connect the reference point Po and both ends (Xi−Exi, Yi) and (Xi+EXi, Yi) of an error range of the X-coordinate passing through the detection point Pi in the image error region Ri. In addition, the range of the image error region Ri in the horizontal direction position is expressed as: θi−Eθi≤θi≤θi+Eθi. That is, the range of the image error region Ri in the X-axis direction is specified as a direction range of a constant angle 2Eθi including the horizontal direction position θi of the image target calculated based on the width of the image target (target width) measured by the image.

The target width is calculated by multiplying the number of pixels indicating the breadth of the target in the image, by the distance between the own vehicle and the target (the distance from the own vehicle to the lower end position of the target, or the distance between the reference point Po and the detection point Pi), and by a predetermined coefficient. To obtain the distance between the own vehicle and the target, the Y-coordinate of the target is required to be specified based on at least the predetermined point at infinity on the road surface on the image and the height of the end position of the target. However, when a road gradient at the position of the own vehicle and a road gradient at the position of the target differ from each other, and when the vertical direction of the monocular camera 3 varies due to pitching of the own vehicle even if the road gradients are the same, the point at infinity on the image is shifted from the actual point. Hence, detection accuracy of the Y-coordinate becomes lower, thereby lowering accuracy in calculating the distance, and furthermore, lowering accuracy in measuring the target width.

Hence, if a correction mode is set in a mode determination process (step) (S50) (S60: YES), the collision reduction ECU 7 performs a region setting process (step) (described later in detail) (S70). In the region setting process, a true value target width, which is a true value of the target width, is estimated, and the position of the image error region Ri is corrected by using the estimated true value target width.

Specifically, in the process (step) of S50, as shown in FIG. 4A, the collision reduction ECU 7 determines whether or not a mode specifying flag described later is set to 0 (S105). In the process (step) of S105, if the collision reduction ECU 7 determines that the mode specifying flag is set to 0 (S105: YES), the mode determination process proceeds to next step S110. In contrast, if the collision reduction ECU 7 determines that the mode specifying flag is not set to 0 (the mode specifying flag is set to 1) (S105: NO), the collision reduction ECU 7 sets a mode (hereinafter, referred to as "basic mode") in which the true value target width is not estimated, and the position of the image error region Ri is not corrected (S140).

Next, the collision reduction ECU 7 determines whether or not the type of the image target is vehicle based on the image target detected in S30 (the target detected based on an image taken by the monocular camera 3) (S110). If the collision reduction ECU 7 determines that the type of the image target is a vehicle in S110 (S110: YES), the mode determination process proceeds to next step S120. In contrast, if the collision reduction ECU 7 determines that the type of the image target is not a vehicle in S110 (S110: NO), the collision reduction ECU 7 sets the basic mode (S140).

Next, the collision reduction ECU 7 determines whether or not the radar target is an object at rest (stationary object) based on the radar target detected in S10 (the target detected based on detection information of the millimeter-wave radar 2) (S120). In this determination, for example, absolute speed of the radar target is obtained based on the relative speed between the radar target and the own vehicle and the speed of the own vehicle. If the absolute speed is zero, the radar target can be determined to be a stationary object. In addition, if the reflection intensity or the waveform of the millimeter waves received from the radar target matches with that received from a predetermined stationary object (e.g. guardrail, sign, signboard or the like), the radar target can be determined to be a stationary object (except vehicles, pedestrians and the like). If the collision reduction ECU 7 determines that the radar target is not a stationary object in S120 (S120: NO), the mode determination process proceeds to next step S130. In contrast, if the collision reduction ECU 7 determines that the radar target is a stationary object in S120 (S120: YES), the collision reduction ECU 7 sets the basic mode (S140).

In S130, the collision reduction ECU 7 sets a mode (hereinafter, referred to as "correction mode") in which the true value target width is estimated, and the position of the image error region Ri is corrected.

Under the condition that the mode specifying flag is set to 0, if the type of target is vehicle, the collision reduction ECU 7 sets the correction mode when the type of target is vehicle. If the type of target is not vehicle (if the type of target is pedestrian, guardrail, sign, signboard or the like), the collision reduction ECU 7 sets the basic mode. The reasons are described below. That is, accuracy in measuring the target width based on the image is higher than that in a case where detection information of the radar is used. Specifically, the accuracy in measuring the breadth of the vehicle can be improved by correction. However, for example, since measurement values of the breadth of a pedestrian are different from each other depending on motion of part of the body of the pedestrian, such as arms and legs, it is considered that the breadth of a pedestrian is not suited to being improved by the correction. In addition, the vehicle is needed to be prevented from being erroneously determined to be the same as a roadside object (e.g. guardrail) or a stationary object such as a sign and a signboard.

Next, the collision reduction ECU 7 determines whether or not the correction mode is set (S60). In S60, if the collision reduction ECU 7 determines that the correction mode is set (S60: YES), the mode determination process proceeds to next step S80 through S70 (region setting process). In contrast, if the collision reduction ECU 7 determines that the correction mode is not set in S60 (that is, the basic mode is set) (S60: NO), the mode determination process proceeds to next step S80 not through S70 (region setting process). Then, the collision reduction ECU 7 determines whether or not an overlapping portion exists between the radar error region Rr and the image error region Ri on the X-Y plane (S80).

If the collision reduction ECU 7 determines that an overlapping portion does not exist (S80: NO), the collision reduction ECU 7 does not determine that the radar target and the image target are the same (the collision reduction ECU 7 determines that the radar target and the image target are different). In the next main process (step) (specifically, the process (step) in S50), the collision reduction ECU 7 sets the mode specifying flag, which specifies permission/prohibition of setting of the correction mode, to 1 which indicates the prohibition of setting of the correction mode (S81).

In contrast, in S80, if the collision reduction ECU 7 determines that the overlapping portion (hatched area in FIG. 3) exists (S80: YES), the collision reduction ECU 7 determines that the radar target and the image target are the same (S85). In this case, the collision reduction ECU 7 defines a position Pf specified by a Y-coordinate Yr of the detection point Pr of the radar target and the horizontal direction position θi of the image target as the position of the target on the X-Y plane (the target is determined as the same). In addition, the collision reduction ECU 7 sets confidence of the accuracy in detecting the position of the target higher. In addition, the collision reduction ECU 7 sets the mode specifying flag to 0 which indicates the permission of setting of the correction mode (S86) in the next main process (step) (specifically, the process (step) of S50).

Next, the collision reduction ECU 7 performs collision reduction control depending on the position and the confidence of the detected target (S90). For example, if the target can cause collision, the collision reduction ECU 7 transmits an alarm signal to the notification unit 6 to make the notification unit 6 provide notification to the driver of the vehicle. In addition, if the possibility of colliding with the target is higher, the collision reduction ECU 7 provides the engine ECU 5 with an instruction to decrease driving force of the internal combustion engine. In addition, the collision reduction ECU 7 provides the brake ECU 4 with an instruction to increase braking force of the own vehicle. Then, the collision reduction ECU 7 changes a control mode depending on the confidence. For example, when the confidence is higher, the collision reduction ECU 7 makes the timing of the control earlier than that in a case where the confidence is lower. When the confidence is lower, the collision reduction ECU 7 makes the timing of the control later than that in a case where the confidence is higher.

<Region Setting Process>

Next, the process (step) of S70 (region setting process) is explained.

In the process (step) of S70, as shown in FIG. 4B, the collision reduction ECU 7 determines whether or not an overlapping portion exists between the radar error region Rr and the image error region Ri on the X-Y plane in the last main process (step) (specifically, the process (step) of S80) (S210). If the collision reduction ECU 7 determines that, in S210, an overlapping portion has existed in the last main process (S210: YES), the region setting process proceeds to the next step S220. In contrast, if the collision reduction ECU 7 determines, in S210, that an overlapping portion has not existed in the last main process (S210: NO), the region setting process returns to the current main process (step) (specifically, the process (step) of S80). Note that in the process (step) of S210, if the collision reduction ECU 7 determines that an overlapping portion has existed multiple times such as the main process (step) before the last, the last main process (step) (that is, when the mode specifying flag is set to 0 multiple times), the collision reduction ECU 7 may proceed to the next step S220.

Figure 5A:
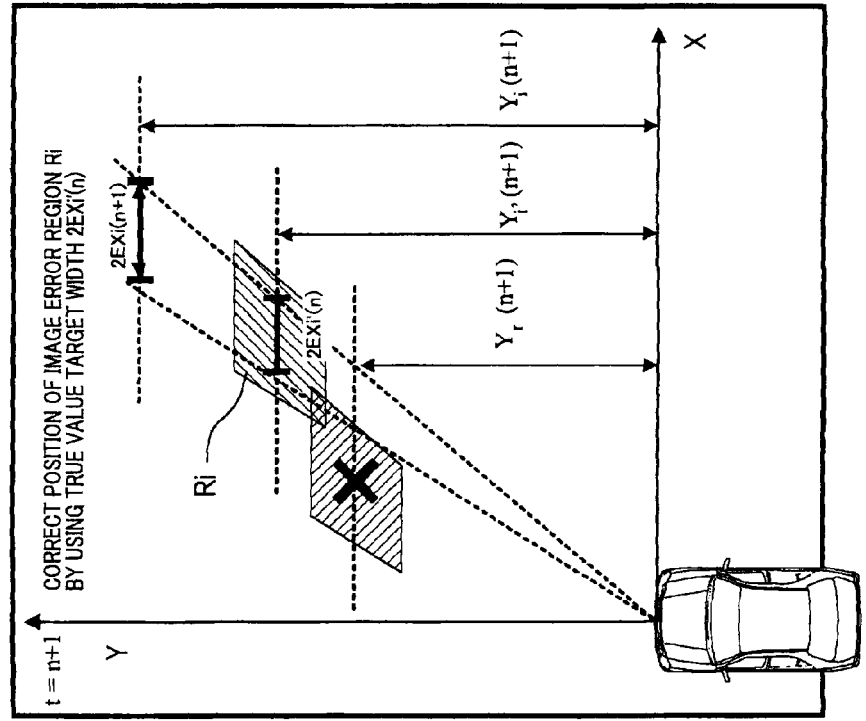
FIG. 5A is a diagram showing a true value target width estimated in the embodiment.

Next, as shown in FIG. 5A, the collision reduction ECU 7 calculates an estimated value 2EXi'(n) as a true value target width of a target width 2EXi(n) in the last process (step) based on a direction range 2Eθi of the image target indicated by the image error region Ri in the last main process (step) (hereinafter, referred to as "last process (step)") and a Y-coordinate Yr(n) of the detection point Pr indicated by the radar error region Rr in the last process (step) (S220). Note that, hereinafter, the estimated value 2EXi'(n) calculated in S220 is referred to as "true value target width 2EXi'(n)". Specifically, in the process (step) of S220, the collision reduction ECU 7 calculates (estimates) the distance between two intersections of both the lines defining the direction range 2Eθi of the image target indicated by the image error region Ri in the last process (step) and a straight line parallel to the X axis indicated by the Y-coordinate Yr(n) of the detection point Pr of the radar target. Note that the calculation of the true value target width 2EXi'(n) may be performed immediately after the determination that an overlapping portion exists in the last process (step) (specifically, S80). The calculation result may be stored in a RAM or the like so the stored value is used in the next step S230. In addition, the calculation result may be maintained in the RAM or the like, while the mode specifying flag is continuously set to 0. In this case, the calculation result may be used in the next or later main process (step) (specifically, the process (step) of S230) until the mode specifying flag is set to 1. In addition, since the true value target width 2EXi'(n) is expressed by an expression: $2EXi'(n)=(Yr(n)/Yi(n))\times 2EXi(n)$, where Yi(n) is a Y-coordinate of the detection point Pi of the image target of the process (step) before the last, this expression can be utilized.

Figure 5B:
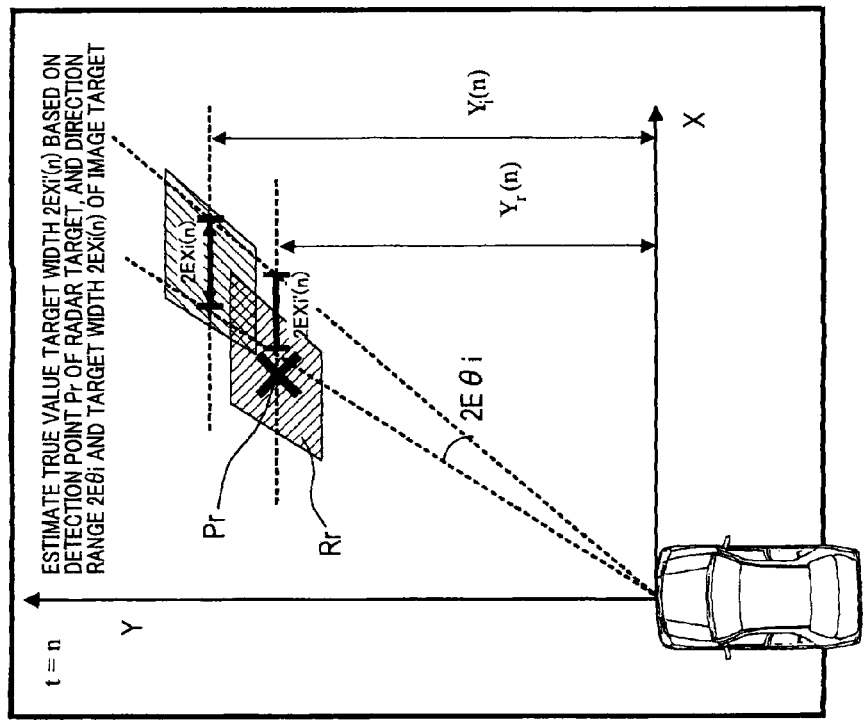
FIG. 5B is a diagram showing an image error region in which position correction is performed in the embodiment.

Next, as shown in FIG. 5B, the collision reduction ECU 7 corrects the position of the image error region Ri set in the current main process (step) (specifically, S40) by using the true value target width 2EXi'(n) calculated (estimated) in S230 (S230). Specifically, in S230, the collision reduction ECU 7 performs calculation in which the position of the image error region Ri where the coordinates of the two intersections of both the lines defining the direction range $2E\theta i(n+1)$ of the image target indicated by the image error region Ri in the current main process (step) (hereinafter, referred to as "current process (step)") and a straight line parallel to the X axis become (Xi−EXi'(n), Yi) and (Xi+EXi(n), Yi), respectively, is defined as the position of the image error region Ri after the correction. In this case, Xi and Yi respectively indicate the X-coordinate and the Y-coordinate of the center position of the image target after the correction (detection point Pi after correction). In addition, an expression, $Yi'(n+1)=(2EXi'(n)/2EXi(n+1))\times Yi(n+1)$, is obtained where a Y-coordinate of the detection point Pi before the correction in the current process (step) is Yi(n+1), and a target width of the current process (step) is 2EXi(n+1). Hence, this expression can be utilized.

<Advantages>

As described above, in the collision reduction apparatus 1, the collision reduction ECU 7 specifies the radar error region Rr including the detection point Pr of the radar target in the X-Y plane, in which the width direction of the own vehicle is defined as the X axis, and the longitudinal direction of the own vehicle is defined as the Y axis, for the radar target detected based on the detection information of the millimeter-wave radar 2. In addition, the collision reduction ECU 7 specifies the image error region Ri of the image target on the X-Y plane, for the image target detected based on the image taken by the monocular camera 3. The collision reduction ECU 7 determines that the radar target and the image target are the same, provided that an overlapping portion exists between the radar error region Rr and the image error region Ri. In addition, the collision reduction ECU 7 estimates a true value target width 2EXi'(n) based on the detection point Pr of the radar target, and the direction range $2E\theta i$ and the target width 2EXi(n) of the image target, and corrects the next position of the image error region Ri by using the estimated true value target width 2EXi'(n).

According to the configuration described above, the accuracy of the position of the image error region Ri can be improved. That is, in the image taken by the monocular camera 3, accuracy in detecting the position in the Y-axis direction is lower, and accuracy in measuring the width (target width) along the X axis of the image target becomes lower due to the influence of the difference between road gradients, a pitching of the vehicle or the like. However, for example, in a relatively narrow direction range centering on the longitudinal direction of the own vehicle (Y axis), accuracy in detecting the direction is relatively high regardless of the above influence. In addition, for example, with respect to targets or the like existing approximately in the longitudinal direction of the own vehicle, while accuracy of the millimeter-wave radar 2 in detecting a position in the X-axis direction is lower than that of the monocular camera 3, accuracy of the millimeter-wave radar 2 in detecting a position in the Y-axis direction is higher than that of the monocular camera 3.

Hence, the true value target width 2EXi'(n) which is a true value of the target width (breadth of the imaged target) is estimated by using the position of the radar target in the Y-axis direction obtained when it is determined that the radar target and the imaged target are the same (the position of the detection point Pr based on the detection information of the millimeter-wave radar 2) and the direction of the image target (the direction of the detection point Pi based on an image taken by the monocular camera 3). Then, the position of the image error region Ri is corrected by using the true value target width 2EXi'(n) of the imaged target estimated as described above.

Hence, according to the collision reduction apparatus 1, compared with a case where the image error region Ri is merely expanded or reduced depending on the distance to the target, a suitable process (step) can be performed even when influence of the difference between road gradients, a pitching of the vehicle, or the like is caused. As a result, erroneous determination can be avoided.

In addition, in the collision reduction apparatus 1, the collision reduction ECU 7 allows the estimation of the true value target width 2EXi'(n) and the position correction of the image error region Ri only when determining that the imaged target is a vehicle based on the image.

According to the above configuration, limiting the target to a vehicle can appropriately improve accuracy in determination concerning the identity of the target. That is, accuracy in measuring the target width 2EXi(n) based on the image is higher than that in a case where detection information of the millimeter-wave radar 2 is used. Specifically, the accuracy in measuring the breadth of the vehicle can be improved by correction. However, for example, since measurement values of the breadth of a pedestrian are different from each other depending on motion of part of the body of the pedestrian, such as arms and legs, it is considered that the breadth of a pedestrian is not suited to being improved by the correction. Hence, by limiting the estimation of the true value target width 2EXi'(n) and the position correction of the image error region Ri to being done only when the target is a vehicle, the accuracy in measuring the target width can be effectively improved. As a result, the accuracy in determination concerning the identity of the target can be appropriately improved.

In addition, in the collision reduction apparatus 1, the collision reduction ECU 7 prohibits the estimation of the true value target width 2EXi'(n) and the position correction of the image error region Ri when determining that the radar target is a stationary object based on the detection information of the millimeter-wave radar 2.

According to the configuration described above, when the target is a stationary object, the estimation of the true value target width 2EXi'(n) and the position correction of the image error region Ri are not done. Hence, the radar target and the image target act so as not to be determined as the same target. Thereby, for example, the timing of the collision avoidance control can be delayed compared with a case where the target is a moving body such as a vehicle or a pedestrian. In addition, for example, the vehicle can be prevented from being erroneously determined to be the same as a stationary object such as a roadside object, a sign and a signboard.

<Other Embodiments>

It will be appreciated that the present invention is not limited to the configurations described above, but any and all modifications, variations or equivalents, which may occur to those who are skilled in the art, should be considered to fall within the scope of the present invention.

For example, in the main process of the above embodiment, in the region setting process of the radar target (S20), the radar error region Rr includes a detection error of the detection point Pr of the radar target. However, the radar error region Rr is not limited to the above. The radar error region Rr may be the detection point Pr of the radar target. That is, in the determination (S80) concerning the possible identity between the radar target and the image target, whether the detection point Pr of the radar target is included in the image error region Ri is determined. If the detection point Pr of the radar target is included in the image error region Ri, the radar target and the image target are determined to be the same. If the detection point Pr of the radar target is not included in the image error region Ri, the radar target and the image target are determined not to be the same.

In addition, in the main process of the above embodiment, in the region setting process of the image target (S40), the error range of the X axis passing through the detection point Pi of the image error region Ri is the target width 2EXi. However, the error range is not limited to the above. The error range may be a range obtained by multiplying the target width 2EXi by a predetermined coefficient, or may be a range obtained by adding a predetermined value to the target width 2EXi. That is, the image error region Ri is not limited, if the image error region Ri includes the detection point Pi of the image target on the X-Y plane, and if the image error region Ri is a range defined based on the direction of the detection point Pi and the target width 2EXi.

In addition, in the mode determination process of the embodiment, a correction mode is set provided that the type of image target is a vehicle (S110: YES), and the radar target is not a stationary object (S120: NO). However, the mode determination process is not limited to the above.

For example, even if it is determined that the type of image target is not vehicle based on the image taken by the monocular camera 3 (S110: NO), and if it is determined that the type of radar target is vehicle based the detection information of the millimeter-wave radar 2, the correction mode may be set even if the radar target is a stationary object (S120: YES).

In addition, for example, even if it is determined that the type of image target is not vehicle based on the image taken by the monocular camera 3 (S110: NO), and if it is determined that the radar target is not a stationary object based the detection information of the millimeter-wave radar 2 (S120: YES), the correction mode may be set.

Hereinafter, aspects of the above-described embodiments will be summarized.

As an aspect of the embodiment, a target detection apparatus (1) is installed in a vehicle, and includes a first specifying means (7, S10 to S20), a second specifying means (7, S30 to S40), and a determination means (7, S80 to S85). The first specifying means specifies, of (regarding) a first target detected based on detection information of a radar (2), a first region which includes a first detection point, which is a detection point of the first target on an X-Y plane on which a width direction of the vehicle is defined as an X-axis, and a longitudinal direction of the vehicle is defined as a Y-axis.

The second specifying means specifies, of (regarding) a second target detected based on an image taken by a camera (3), a second region which includes a second detection point, which is a detection point of the second target on the X-Y plane, based on a direction of the second detection point and a target width, which is a width along the X-axis of the second target.

The determination means determines that the first target and the second target are the same, provided that an overlapping portion exists between the first region and the second region.

According to the configuration described above, even when the first detection point and the second detection point do not completely coincide with each other, the first target and the second target can be determined to be the same. Hence, even when the first detection point and the second detection point are different from each other due to a detection error or the like, the first target and the second target can be prevented from being determined to be different. However, if a measurement error of the target width is generated due to the difference between road gradients and influence of the pitching of the vehicle, the second region is deviated from the first region. Hence, even when the first target and the second target are the same in practice, the first target and the second target can be erroneously determined not to be the same.

To solve the above problem, the target detection apparatus further includes a true value target width estimation means (7, S210 to S220) and a position correction means (7, S230).

The true value target width estimation means estimates a true value target width, which is a true value of the target width, based on the direction of the second detection point of the second region and the first detection point of the first region, provided that the determination means determines that the first target and the second target are the same.

The position correction means corrects a position of the second region specified by the second specifying means next time by using the true value target width as the target width.

According to the configuration described above, the accuracy of the position of the second region can be improved. That is, of (regarding) the camera and the second specifying means, accuracy in detecting the position in the Y-axis direction is lower, and accuracy in measuring the width (target width) along the X axis of the second target becomes lower due to the influence of the difference between road gradients, a pitching of the vehicle or the like. However, for example, in a relatively narrow direction range centering on the longitudinal direction of the own vehicle, accuracy in detecting the direction is relatively high regardless of the above influence. In addition, for example, with respect to targets or the like existing approximately in the longitudinal direction of the own vehicle, while accuracy of the radar in detecting a position in the X-axis direction is lower than that of the camera, accuracy of the radar in detecting a position in the Y-axis direction is higher than that of the camera.

Hence, the second target width (measurement width obtained by the camera) is estimated by using the position (detection position obtained by the radar) of the first target in the Y-axis direction obtained when it is determined that the first target and the second target are the same and the direction of the second target (detection direction obtained by the camera). Then, the position of the second region is corrected by using the second target width (true value target width) estimated as described above.

Hence, according to the embodiment, compared with a case where the second region is merely expanded or reduced depending on the distance to the target, a suitable process can be performed even when influence of the difference between road gradients, a pitching of the vehicle, or the like is caused. As a result, erroneous determination can be avoided.

Note that the first region may include a detection error of the first detection point, or may be the first detection point. In addition, the position correction means may use the estimated true value target width only for correcting the position of the second region specified by the second specifying means next time, after the first target and the second target are determined to be the same. The position correction means may use the estimated true value target width only for correcting the position of the second region specified by the second specifying means the time after next or later, until the first target and the second target are determined not to be the same.

In addition, the present invention can be realized as a computer program. In particular, the program allows a computer to perform the first specifying means, the second specifying means, the determination means, the true value target width estimation means, and the position correction means.

The computer program may be incorporated into one or more computers, thereby obtaining advantages similar to those obtained by the target detection apparatus. Note that the computer program may be stored in a recording medium, which is incorporated in a computer, such as a ROM and a flash memory. The computer program may be loaded from the recording medium into the computer, or may be loaded from the recording medium into the computer via a network.

In addition, the computer program may be used in a state of being stored in a computer readable recording device (recording medium). The recording medium includes a portable semiconductor memory (e.g. USB memory, memory card (trademark)).

What is claimed is:

1. A target detection apparatus which is installed in a vehicle, the target detection apparatus comprising:
   a first specifying unit specifying, regarding a first target detected based on detection information of a radar, a first region within an X-Y plane, the first region including a first detection point, which is a detection point of the first target in the X-Y plane, a width direction of the vehicle being defined as an X-axis of the X-Y plane, and a longitudinal direction of the vehicle being defined as a Y-axis of the X-Y plane;
   a second specifying unit specifying, regarding a second target detected based on an image taken by a camera, a second region within the X-Y plane, the second region including a second detection point, which is a detection point of the second target in the X-Y plane, based on a direction of the second detection point and a target width, which is a width along the X-axis of the second target;
   a determination unit determining that the first target and the second target are the same target, provided that an overlapping portion exists between the first region specified by the first specifying unit and the second region specified by the second specifying unit;
   a true value target width estimation unit estimating a true value target width, which is a true value of the target width, based on the direction of the second detection point of the second region specified by the second unit and the first detection point of the first region specified by the first specifying unit, provided that the determination unit determines that the first target and the second target are the same; and
   a second region position correction unit correcting a position of the second region specified by the second specifying unit by using the true value target width, which is estimated by the true value target width estimation unit, as the target width.

2. The target detection apparatus according to claim 1, further comprising a permission unit permitting the true value target width estimation unit to estimate the true value target width and permitting the second region position correction unit to correct the position of the second region, only when determining that the second target is a vehicle based on the image.

3. The target detection apparatus according to claim 1, further comprising a prohibition unit prohibiting the true value target width estimation unit from estimating the true value target width and prohibiting the second region position correction unit from correcting the position of the second region, when determining that the first target is a stationary object based on the detection information.

4. The target detection apparatus according to claim 1, wherein:
   the true value target width estimation unit estimates the true value target width from a calculation result of $(Yr(n)/Yl(n)) \times 2EXi(n)$, on conditions that, regarding the second target detected based on the image taken by a camera, the target width is $2EXi(n)$, and a Y-coordinate of the second detection point is $Yi(n)$, and regarding the first target detected based on the detection information of the radar, a Y-coordinate of the first detection point is $Yr(n)$.

5. The target detection apparatus according to claim 1, wherein:
   the second region position correction unit corrects the position of the second region from a calculation result of $(2EXi'(n)/2EXi(n+1)) \times Yi(n+1)$, on conditions that, regarding the second target detected based on the image taken by a camera, a Y-coordinate of the second detection point is $Yi(n+1)$, and the target width is $2EXi(n+1)$, and the true value target width estimated by the true value target width estimation means is $2EXi'(n)$.

6. The target detection apparatus according to claim 2, further comprising a prohibition unit prohibiting the true value target width estimation unit from estimating the true value target width and prohibiting the second region position correction unit from correcting the position of the second region, when determining that the first target is a stationary object based on the detection information.

7. The target detection apparatus according to claim 2, wherein:
   the true value target width estimation unit estimates the true value target width from a calculation result of $(Yr(n)/Yl(n)) \times 2EXi(n)$, on conditions that, regarding the second target detected based on the image taken by a camera, the target width is $2EXi(n)$, and a Y-coordinate of the second detection point is $Yi(n)$, and regarding the first target detected based on the detection information of the radar, a Y-coordinate of the first detection point is $Yr(n)$.

8. The target detection apparatus according to claim 2, wherein:
   the second region position correction unit corrects the position of the second region from a calculation result of $(2EXi'(n)/2EXi(n+1)) \times Yi(n+1)$, on conditions that, regarding the second target detected based on the image taken by a camera, a Y-coordinate of the second detection point is $Yi(n+1)$, and the target width is $2EXi(n+1)$, and the true value target width estimated by the true value target width estimation means is $2EXi'(n)$.

9. The target detection apparatus according to claim 3, wherein:
   the true value target width estimation unit estimates the true value target width from a calculation result of $(Yr(n)/Yl(n)) \times 2EXi(n)$, on conditions that, regarding the second target detected based on the image taken by a camera, the target width is $2EXi(n)$, and a Y-coordinate of the second detection point is $Yi(n)$, and regarding the first target detected based on the detection information of the radar, a Y-coordinate of the first detection point is $Yr(n)$.

10. The target detection apparatus according to claim 3, wherein:
    the second region position correction unit corrects the position of the second region from a calculation result of $(2EXi'(n)/2EXi(n+1)) \times Yi(n+1)$, on conditions that, regarding the second target detected based on the image taken by a camera, a Y-coordinate of the second detection point is $Yi(n+1)$, and the target width is $2EXi(n+1)$, and the true value target width estimated by the true value target width estimation means is $2EXi'(n)$.

11. The target detection apparatus according to claim 4, wherein:

the second region position correction unit corrects the position of the second region from a calculation result of $(2EXi'(n)/2EXi(n+1)) \times Yi(n+1)$, on conditions that, regarding the second target detected based on the image taken by a camera, a Y-coordinate of the second detection point is $Yi(n+1)$, and the target width is $2EXi(n+1)$, and the true value target width estimated by the true value target width estimation means is $2EXi'(n)$.

* * * * *